US012654665B2

(12) United States Patent
Kim

(10) Patent No.: US 12,654,665 B2
(45) Date of Patent: Jun. 16, 2026

(54) ELECTRONIC BRAKE SYSTEM

(71) Applicant: HL MANDO CORPORATION, Gyeonggi-do (KR)

(72) Inventor: Jinseok Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 404 days.

(21) Appl. No.: 18/270,468

(22) PCT Filed: Dec. 29, 2021

(86) PCT No.: PCT/KR2021/020214
§ 371 (c)(1),
(2) Date: Jun. 29, 2023

(87) PCT Pub. No.: WO2022/146048
PCT Pub. Date: Jul. 7, 2022

(65) Prior Publication Data
US 2024/0059265 A1     Feb. 22, 2024

(30) Foreign Application Priority Data
Dec. 29, 2020     (KR) ........................ 10-2020-0185744

(51) Int. Cl.
*B60T 8/40*          (2006.01)
*B60T 8/94*          (2006.01)
(Continued)

(52) U.S. Cl.
CPC .............. *B60T 8/94* (2013.01); *B60T 8/4081* (2013.01); *B60T 13/142* (2013.01); *B60T 13/58* (2013.01);
(Continued)

(58) Field of Classification Search
CPC ... B60T 13/58–745; B60T 13/142–148; B60T 7/042; B60T 2270/402–404;
(Continued)

(56) References Cited

U.S. PATENT DOCUMENTS

2014/0028084 A1     1/2014  Biller et al.
2017/0282877 A1*   10/2017  Besier ..................... B60T 8/885
(Continued)

FOREIGN PATENT DOCUMENTS

JP          2007-216850         8/2007
KR     10-2016-0088382          7/2016
(Continued)

OTHER PUBLICATIONS

International Search Report for PCT/KR2021/020214 mailed on Apr. 22, 2022 and its English Machine Translation by the WIPO (now published as WO 2022/146048).
(Continued)

*Primary Examiner* — David R Morris
(74) *Attorney, Agent, or Firm* — WOMBLE BOND DICKINSON (US) LLP

(57) ABSTRACT

An electronic brake system comprises: a first block in which arranged is a mechanical part that is linked with a brake pedal to be mechanically operated; a second block in which arranged is an electronic part that is electronically operated and controlled by an electronic control unit; an emergency module which operates when the electronic part is inoperative, and secondarily provides a fluid pressure; and connection lines which hydraulically connect the first block and the second block and the emergency module, wherein the first block and the second block and the emergency module may be installed at positions spaced from each other in a vehicle, and thus the mountability of the brake system and the degree of freedom in designing a vehicle may be improved.

13 Claims, 7 Drawing Sheets

(51) Int. Cl.

| | |
|---|---|
| *B60T 13/14* | (2006.01) |
| *B60T 13/58* | (2006.01) |
| *B60T 13/68* | (2006.01) |
| *B60T 13/74* | (2006.01) |
| *B60T 17/04* | (2006.01) |

(52) U.S. Cl.
CPC .......... *B60T 13/686* (2013.01); *B60T 13/745* (2013.01); *B60T 17/04* (2013.01)

(58) Field of Classification Search
CPC ............ B60T 8/4081–409; B60T 8/94; B60T 17/04–046; B60T 17/22
See application file for complete search history.

(56) References Cited

U.S. PATENT DOCUMENTS

| | | | | |
|---|---|---|---|---|
| 2019/0232935 A1* | 8/2019 | Kim | ...................... | B60T 13/686 |
| 2019/0366997 A1* | 12/2019 | Jeong | .................... | B60T 13/167 |
| 2023/0294651 A1* | 9/2023 | Cho | ...................... | B60T 17/221 |

FOREIGN PATENT DOCUMENTS

| | | |
|---|---|---|
| KR | 10-2020-0108541 | 9/2020 |
| KR | 10-2020-0108542 | 9/2020 |

OTHER PUBLICATIONS

Written Opinion of the International Searching Authority for PCT/KR2021/020214 mailed on Apr. 22, 2022 and its English Machine Translation by the WIPO (now published as WO 2022/146048).
Office Action (1st) dated Mar. 26, 2025 for Korean Patent Application No. 10-2020-0185744 and its English translation provided by Applicant's foreign counsel.

* cited by examiner

ELECTRONIC BRAKE SYSTEM

CROSS-REFERENCE TO RELATED APPLICATIONS

This application is the U.S. National Stage of International Patent Application No. PCT/KR2021/020214 filed on Dec. 29, 2021, which claims priority to and benefit of Korean Patent Application No. 10-2020-0185744, filed on Dec. 29, 2020, the disclosures of which are incorporated herein by reference in their entirety.

TECHNICAL FIELD

The present invention relates to an electronic brake system, and more particularly, to an electronic brake system for generating a braking force using an electrical signal corresponding to a displacement of a brake pedal.

BACKGROUND ART

A brake system for performing braking is essentially installed on a vehicle, and various types of brake systems have been proposed for the safety of drivers and passengers.

In a conventional brake system, a method of supplying hydraulic pressure required for braking to wheel cylinders using a mechanically connected booster when a driver presses a brake pedal has been mainly used. However, as market demands to implement various braking functions in a detailed response to operation environments of vehicles increase, in recent years, an electronic brake system, which receives a driver's intention to brake as an electrical signal from a pedal displacement sensor that detects a displacement of a brake pedal when the driver presses the brake pedal and operates a hydraulic pressure supply device based on the electrical signal to supply hydraulic pressure required for braking to wheel cylinders, has been widely used.

In such an electronic brake system, an electrical signal is generated and provided when the driver operates the brake pedal in a normal operation mode, and based on the electrical signal, the hydraulic pressure supply device is electrically operated and controlled to generate hydraulic pressure required for braking and transmit the hydraulic pressure to the wheel cylinders. As such, although such an electronic brake system is electrically operated and controlled so that complex and various braking operations may be implemented, when a technical problem occurs in an electric component, hydraulic pressure required for braking may not be stably generated, and thus the safety of passengers may be threatened.

Accordingly, the electronic brake system enters an abnormal operation mode when a component fails or becomes out of control, and in this case, a mechanism is required in which the driver's operation of the brake pedal is directly linked to the wheel cylinders. That is, in the abnormal operation mode of the electronic brake system, as the driver applies a pedal force to the brake pedal, hydraulic pressure required for braking needs to be generated immediately and transmitted directly to the wheel cylinders.

Meanwhile, when an electronic brake system is mounted on a vehicle, a degree of design freedom of the vehicle is limited due to the limitations of the size and installation position of a system module. Accordingly, a method capable of efficiently installing a system module while maintaining braking performance of a vehicle is required.

DISCLOSURE

Technical Problem

The present invention is directed to providing an electronic brake system capable of effectively implementing braking in various operating situations.

The present invention is directed to providing an electronic brake system with improved performance and operational reliability.

The present invention is directed to providing an electronic brake system capable of providing a stable pedal feeling to a driver in various operating situations.

The present invention is directed to providing an electronic brake system capable of improving a degree of design freedom of a vehicle.

The present invention is directed to providing an electronic brake system capable of performing easily and efficiently installing and disposing in the vehicle.

Technical Solution

One aspect of the present invention provides an electronic brake system including a first block in which a mechanical unit linked with a brake pedal to be mechanically operated is disposed, a second block in which an electronic unit electronically operated and controlled by an electronic control unit is disposed and which is disposed to be spaced apart from the first block, an emergency module operating when the electronic unit is inoperative and secondarily providing hydraulic pressure to a wheel cylinder, and a connection line hydraulically connecting the first block, the second block, and the emergency module, wherein the mechanical unit may include an integrated master cylinder having a first master piston connected to the brake pedal, a first master chamber whose volume is variable by a displacement of the first master piston, a second master piston provided to be displaceable by the displacement of the first master piston, a second master chamber whose volume is variable by a displacement of the second master piston, and a pedal simulator provided between the first master piston and the second mater piston, the electronic unit may include a hydraulic pressure supply device generating a hydraulic pressure by operating a hydraulic piston by an electrical signal output in response to a displacement of the brake pedal or an electrical signal output from the electronic control unit and a hydraulic control unit having a plurality of flow paths and valves to control the hydraulic pressure transmitted from the hydraulic pressure supply device to the wheel cylinder, the emergency module may include a hydraulic pressure auxiliary device operating when the hydraulic pressure supply device is inoperative and providing hydraulic pressure to the wheel cylinder, and the connection line may include a first connection line having one end connected to the second master chamber and the other end connected to the hydraulic control unit.

The hydraulic control unit may include a first hydraulic circuit controlling hydraulic pressure transmitted to a first wheel cylinder and a second wheel cylinder and a second hydraulic circuit controlling hydraulic pressure transmitted to a third wheel cylinder and a fourth wheel cylinder, and the hydraulic pressure auxiliary device may be provided between the first and second wheel cylinders and the first hydraulic circuit.

The other end of the first connection line may be connected between the first hydraulic circuit and the hydraulic pressure auxiliary device.

The electronic unit may further include at least one cut value provided in the first connection line and controlling a flow of a pressurized medium.

The first hydraulic circuit may include a first inlet valve and a second inlet valve respectively controlling flows of the pressurized medium supplied to the first wheel cylinder and the second wheel cylinder, and the other end of the first connection line may be branched and connected to a downstream side of each of the first and second inlet valves.

The electronic unit may further include a sub-reservoir in which a pressurized medium is stored, a dump flow path connecting the second hydraulic circuit and the sub-reservoir, and a dump valve provided on the dump flow path and controlling a flow of the pressurized medium.

The second hydraulic circuit may include a third inlet valve and a fourth inlet valve respectively controlling flows of the pressurized medium supplied to the third wheel cylinder and the fourth wheel cylinder, and the dump flow path may have one end connected to the sub-reservoir and the other end connected to an upstream side of each of the third and fourth inlet valves.

The hydraulic pressure auxiliary device may include a first isolation valve and a second isolation valve respectively allowing and blocking flows of the pressurized medium transmitted from the integrated master cylinder and the hydraulic pressure supply device to the first wheel cylinder and the second wheel cylinder, a pump pressurizing the pressurized medium, a motor driving the pump, a first auxiliary hydraulic flow path transmitting the pressurized medium pressurized by the pump to the first wheel cylinder, and a second auxiliary hydraulic flow path transmitting the pressurized medium pressurized by the pump to the second wheel cylinder.

The hydraulic pressure auxiliary device may further include a first auxiliary dump flow path discharging the pressurized medium applied to the first wheel cylinder and a second auxiliary dump flow path discharging the pressurized medium applied to the second wheel cylinder.

The hydraulic pressure auxiliary device may further include a first support valve provided on the first auxiliary hydraulic flow path to control the flow of the pressurized medium, a second support valve provided on the second auxiliary hydraulic flow path to control the flow of the pressurized medium, a first discharge valve provided on the first auxiliary dump flow path to control the flow of the pressurized medium, and a second discharge valve provided on the second auxiliary dump flow path to control the flow of the pressurized medium.

The connection line may further include a second connection line having one end connected to a sub-reservoir and the other end connected to the hydraulic pressure auxiliary device, and the other end of the second connection line may be connected to an inlet end of the pump and the first and second auxiliary dump flow paths.

The mechanical unit may further include a main reservoir in which the pressurized medium is stored, and the connection line may further include a third connection line having one end connected to the main reservoir and the other end connected to the sub-reservoir.

The first connection line may be provided as a pipe having rigidity, and the second connection line and the third connection line may be provided as hoses having elasticity.

The electronic unit may be provided further including a dump control unit provided between the sub-reservoir and the hydraulic pressure supply device to control the flow of a pressurized medium.

The second hydraulic circuit may further include a first outlet valve and a second outlet valve respectively controlling flows of the pressurized medium discharged from the third wheel cylinder and the fourth wheel cylinder to the sub-reservoir.

Advantageous Effects

An electronic brake system according to the present embodiment can stably and effectively implement braking in various operating situations of a vehicle.

An electronic brake system according to the present embodiment can improve performance and operational reliability of the product.

An electronic brake system according to the present embodiment can stably provide a braking pressure even when a component fails.

An electronic brake system according to the present embodiment can improve a degree of design freedom of the vehicle.

An electronic brake system according to the present embodiment can easily and efficiently perform installing and disposing in the vehicle.

An electronic brake system according to the present embodiment can provide a stable pedal feeling to a driver in various operating situations.

MODES OF THE INVENTION

Hereinafter, embodiments of the present invention will be described in detail with reference to the accompanying drawings. The following embodiments are provided to fully convey the spirit of the present invention to a person having ordinary skill in the art to which the present invention belongs. The present invention is not limited to the embodiments shown herein but may be embodied in other forms. The drawings may omit the illustration of parts not related to the description in order to clarify the present invention, and slightly exaggerate the size of the components to help understanding.

Figure 1:
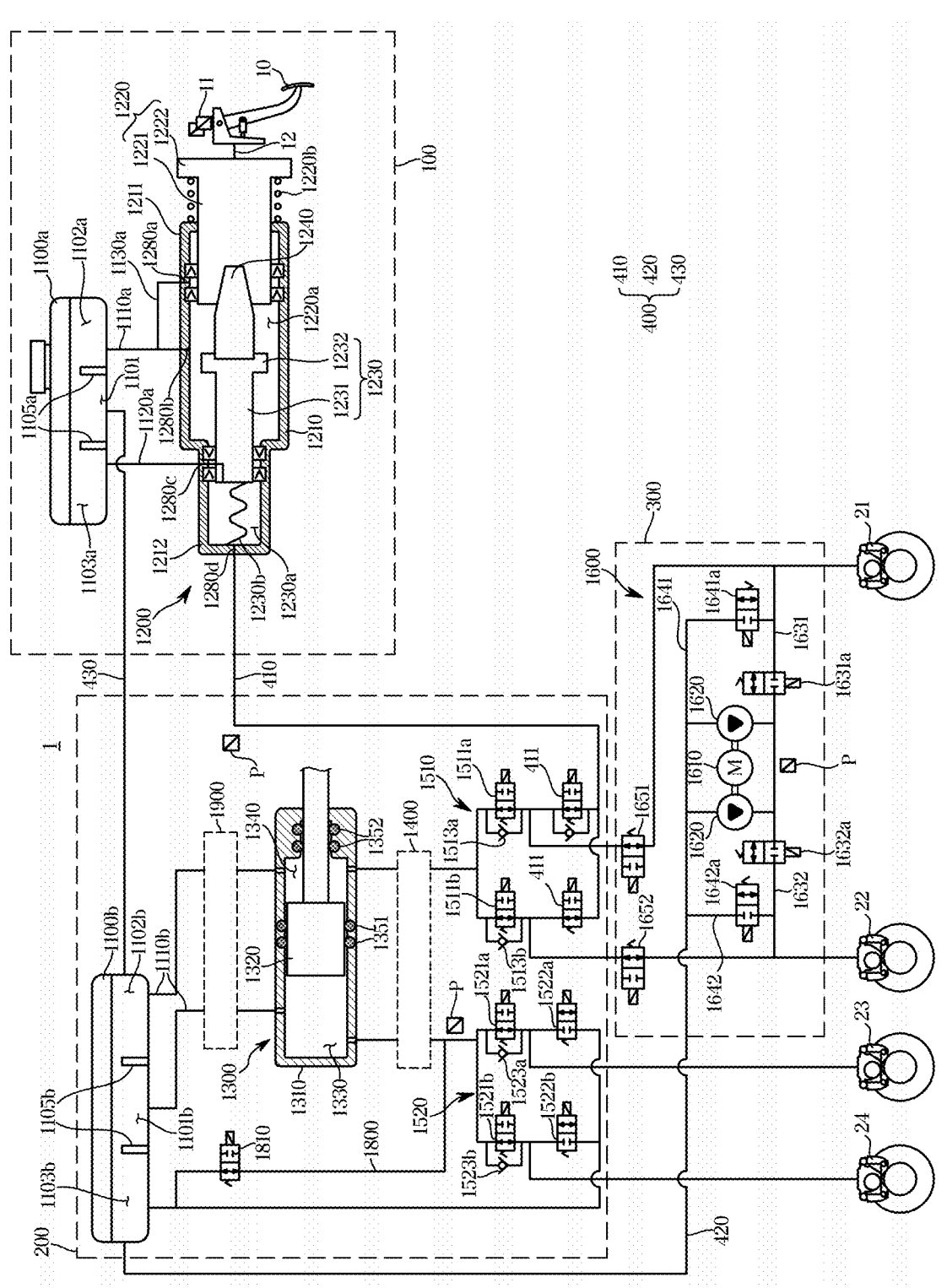
FIG. 1 is a hydraulic circuit diagram illustrating an electronic brake system according to an embodiment of the present invention.

FIG. 1 is a hydraulic circuit diagram illustrating an electronic brake system 1 according to an embodiment of the present invention.

Referring to FIG. 1, the electronic brake system 1 according to the embodiment of the present invention may include a first block 100 in which a mechanical unit mechanically operated is disposed, a second block 200 in which an electronic unit electronically operated and controlled is disposed, an emergency module 300 which operates when the electronic unit is inoperative, and secondarily provides hydraulic pressure, and a plurality of connection lines 400 hydraulically connecting the first block 100, the second block 200, and the emergency module 300.

In the first block 100, the mechanical unit mechanically operated by being connected and linked with a brake pedal 10 is disposed, and in the second block 200, the electronic unit electronically operated and controlled is disposed such as a valve, a sensor, and the like whose operation is controlled by an electronic control unit (not shown). The first block 100 and the second block 200 may be disposed to be spaced apart from each other in a vehicle, while hydraulically connected by the plurality of connection lines 400, and thus mountability of the electronic brake system 1 on the vehicle may be improved and furthermore a degree of design freedom of the vehicle may be improved so that efficient space arrangement may be possible. In addition, the emergency module 300 may be disposed in the second block 200 or disposed to be spaced apart from the second block 200 in the vehicle.

The mechanical unit may include components performing mechanical operations linked with the brake pedal 10 irrespective of a control signal of the electronic control unit and may be disposed in the first block 100.

The mechanical unit may include a main reservoir 1100a in which a pressurized medium such as brake oil or the like is stored, an integrated master cylinder 1200 that provides a reaction force according to a pedal force of the brake pedal 10 to a driver and pressurizes and discharges the pressurized medium such as brake oil or the like accommodated therein, and main reservoir flow paths 1110a and 1120a connecting the main reservoir 1100a and the integrated master cylinder 1200.

The integrated master cylinder 1200 is provided to, when the driver applies a pedal force to the brake pedal 10 for braking operation, provide a reaction force thereagainst to the driver to provide a stable pedal feeling, and at the same time pressurize and discharge the pressurized medium accommodated therein by the operation of the brake pedal 10.

In the integrated master cylinder 1200, a simulation unit providing a pedal feeling to the driver and a master cylinder unit pressurizing and discharging the pressurized medium accommodated therein by a pedal force of the brake pedal may be disposed coaxially in a cylinder body 1210.

Specifically, the integrated master cylinder 1200 may include the cylinder body 1210 having a chamber formed therein, a first master chamber 1220a formed on an inlet side of the cylinder body 1210 to which the brake pedal 10 is connected, a first master piston 1220 provided in the first master chamber 1220a and connected to the brake pedal 10 to be displaceable by the operation of the brake pedal 10, a second master chamber 1230a formed on an inner or front side (left side of FIG. 1) of the first master chamber 1220a on the cylinder body 1210, a second master piston 1230 provided in the second master chamber 1230a and provided to be displaceable by a displacement of the first master piston 1220 or hydraulic pressure of the pressurized medium accommodated in the first master chamber 1220a, and a pedal simulator 1240 disposed between the first master piston 1220 and the second master piston 1230 to provide a pedal feeling through an elastic restoring force generated during compression.

The first master chamber 1220a and the second master chamber 1230a may be sequentially formed toward the inside (left side of FIG. 1) from the brake pedal 10 (right side of FIG. 1) on the cylinder body 1210 of the integrated master cylinder 1200. Also, the first master piston 1220 and the second master piston 1230 may be provided in the first master chamber 1220a and the second master chamber 1230a, respectively, to generate hydraulic pressure or generate negative pressure by the pressurized medium accommodated in the respective chambers depending on forward or backward movement.

The cylinder body 1210 may include a large diameter portion 1211 with the first master chamber 1220a formed therein and an inner diameter formed to be relatively large and a small diameter portion 1212 with the second master chamber 1230a formed therein and an inner diameter formed to be smaller than the large diameter portion 1211. The large diameter portion 1211 and the small diameter portion 1212 of the cylinder body 1210 may be integrally formed.

The first master chamber 1220a may be formed at an inner side of the large diameter portion 1211, that is, on an inlet side or rear side (right side of FIG. 1) of the cylinder body 1210, and the first master piston 1220 connected to the brake pedal 10 via an input rod 12 may be accommodated in the first master chamber 1220a to be reciprocally movable.

The pressurized medium may be introduced into and discharged from the first master chamber 1220a through a first hydraulic port 1280a and a second hydraulic port 1280b. The first hydraulic port 1280a is connected to an auxiliary reservoir flow path 1130a, which will be described below, so that the pressurized medium may be introduced into the first master chamber 1220a from the main reservoir 1100a, and the second hydraulic port 1280b is connected to a first main reservoir flow path 1110a, which will be described below, so that the pressurized medium may be introduced into the first master chamber 1220a from the main reservoir 1100a, or conversely, the pressurized medium may be discharged into the main reservoir 1100a from the first master chamber 1220a.

A pair of sealing members may be provided in front and rear of the first hydraulic port 1280a. The pair of sealing members may allow the flow of the pressurized medium from the main reservoir 1100a toward the first master chamber 1220a and block the flow of the pressurized medium discharged from the first master chamber 1220a to the auxiliary reservoir flow path 1130a.

The first master piston 1220 may be accommodated and provided in the first master chamber 1220a, and may generate hydraulic pressure by pressurizing the pressurized medium accommodated in the first master chamber 1220a by moving forward (left direction of FIG. 1) or pressurize the pedal simulator 1240 to be described below, and generate negative pressure inside the first master chamber 1220a by moving backward (right direction of FIG. 1). The first master piston 1220 may include a first body 1221 formed in a cylindrical shape to be in close contact with an inner-circumferential surface of the first master chamber 1220a and a first flange 1222 formed by extending in a radial direction at a rear end (right end portion of FIG. 1) of the first body 1221 and to which the input rod 12 is connected. The first master piston 1220 may be elastically supported by a first piston spring 1220*b*, and the first piston spring 1220*b* may be provided with one end supported by a front surface (left surface of FIG. 1) of the first flange 1222 and the other end supported by an outer surface of the cylinder body 1210.

The second master chamber 1230*a* may be formed on an inner side of the small diameter portion 1212, that is, on the inner side or front side (left side of FIG. 1) of the cylinder body 1210, and the second master piston 1230 may be accommodated in the second master chamber 1230*a* to be reciprocally movable.

The pressurized medium may be introduced into and discharged from the second master chamber 1230*a* through a third hydraulic port 1280*c* and a fourth hydraulic port 1280*d*. The third hydraulic port 1280*c* is connected to a second main reservoir flow path 1120*a*, which will be described below, so that the pressurized medium may be introduced into the second master chamber 1230*a* from the main reservoir 1100*a*, and the fourth hydraulic port 1280*d* is connected to a first connection line, which will be described below, so that the pressurized medium accommodated in the second master chamber 1230*a* may be discharged to the first connection line 410, or conversely, the pressurized medium may be introduced into the second master chamber 1230*a* from the first connection line 410.

A pair of sealing members may be provided in front and rear of the third hydraulic port 1280*c*. The pair of sealing members may allow the flow of the pressurized medium introduced into the second master chamber 1230*a* from the main reservoir 1100*a* via the second main reservoir flow path 1120*a* and block the flow of the pressurized medium discharged from the second master chamber 1230*a* to the second reservoir flow path 1120*a*.

The second master piston 1230 may be accommodated and provided in the second master chamber 1230*a*, and may generate hydraulic pressure of the pressurized medium accommodated in the second master chamber 1230*a* by moving forward and generate negative pressure in the second master chamber 1230*a* by moving backward. The second master piston 1230 may include a second body 1231 formed in a cylindrical shape to be in close contact with an inner-circumferential surface of the second master chamber 1230*a* and a second flange 1232 formed by extending in a radial direction at a rear end portion (right end portion of FIG. 1) of the second body 1231 and disposed on an inner side of the first master chamber 1220*a*. A diameter of the second flange 1232 may be formed to be larger than a diameter of the inner-circumferential surface of the second master chamber 1230*a*. The second master piston 1230 may be elastically supported by a second piston spring 1230*b*, and the second piston spring 1230*b* may be provided with one end supported by a front surface (left surface of FIG. 1) of the second body 1231 and the other end supported by an inner surface of the cylinder body 1210.

The pedal simulator 1240 may be provided between the first master piston 1220 and the second master piston 1230 and provide a pedal feeling of the brake pedal 10 to the driver by its own elastic restoring force. Specifically, the pedal simulator 1240 may be interposed between the front surface of the first master piston 1220 and the rear surface of the second master piston 1230 and made of an elastic material such as compressible and expandable rubber or the like.

The pedal simulator 1240 may include a tapered portion 1241 at least partially inserted into and supported by the front surface of the first master piston 1220 and having a diameter gradually increasing in a forward direction (left side of FIG. 1) and a body portion 1242 with a cylindrical shape in contact with the rear surface of the second master piston 1230 or at least partially inserted into and supported by the rear surface. As both ends of the pedal simulator 1240 are inserted into or supported by the first master piston 1220 and the second master piston 1230, respectively, the pedal simulator 1240 may be stably modified. Furthermore, as the tapered portion 1241 changes the elastic restoring force according to a pedal force of the brake pedal 10, a stable and familiar pedal feeling may be provided to the driver.

When describing a pedal simulation operation by the integrated master cylinder 1200, when the driver operates the brake pedal 10 in the normal operation mode, a cut valve 411 provided in the first connection line 410, which will be described below, is closed simultaneously. As the operation of the brake pedal 10 progresses, the first master piston 1220 moves forward, but the second master chamber 1230*a* is sealed by a closing operation of the cut valve 411, so that a displacement of the second master piston 1230 is not generated. At this time, by the closing operation of the cut valve 411, the pressurized medium accommodated in the first master chamber 1220*a* is introduced into the main reservoir 1100*a* through the first main reservoir flow path 1110*a*. The second master piston 1230 is unable to move forward, while the first master piston 1220 continuously moves forward to compress the pedal simulator 1240, so that the elastic restoring force of the pedal simulator 1240 may be provided to the driver as a pedal feeling. Next, when the driver releases the pedal force of the brake pedal 10, the first master piston 1220 and the pedal simulator 1240 may return to the original shape and position thereof by the first and second piston springs 1220*b* and 1230*b* and the elastic restoring force of the pedal simulator 1240, and the first master chamber 1220*a* may be filled with the pressurized medium supplied from the main reservoir 1100*a* through the first main reservoir flow path 1110*a*.

Thus, because the insides of the first master chamber 1220*a* and the second master chamber 1230 are always filled with the pressurized medium, when the pedal simulation is operated, friction of the first master piston 1220 and the second master piston 1230 is minimized, so that the durability of the integrated master cylinder 1200 may be improved, and the inflow of foreign substances from the outside may be blocked.

Meanwhile, the operation of the integrated master cylinder 1200 when the electronic brake system 1 operates abnormally, that is, in the operating state of a fallback mode will be described below with reference to FIGS. 6 and 7.

The main reservoir 1100*a* may accommodate and store the pressurized medium therein. The main reservoir 1100*a* may be connected to each component such as the integrated master cylinder 1200, a third connection line 430, which will be described below, and the like, and supply or receive the pressurized medium.

The main reservoir 1100*a* may be provided by being divided into a plurality of chambers by partition walls 1105*a*. The main reservoir 1100*a* may include a plurality of main reservoir chambers 1101*a*, 1102*a*, and 1103*a*, and the plurality of main reservoir chambers 1101*a*, 1102*a*, and 1103*a* may be disposed side by side in a single row. Specifically, the main reservoir 1100*a* may be distinguished into a first main reservoir chamber 1101*a* disposed at the center, a second main reservoir chamber 1102*a* disposed at one side, and a third main reservoir chamber 1103*a* disposed at the other side.

Each of the partition walls 1105a may be provided between adjacent main reservoir chambers, and each of the partition walls 1105a may be provided with at least a part of an upper end open. Thus, the adjacent main reservoir chambers 1101a, 1102a, and 1103a may communicate with each other so that the pressurized medium may move. As an example, when a large amount of pressurized medium is introduced into the first main reservoir chamber 1101a, the pressurized medium may pass over the upper end of the partition walls 1105a and be transmitted to the second main reservoir chamber 1102a or the third main reservoir chamber 1103a.

The first main reservoir chamber 1101a may be connected to the third connection line 430, which will be described below, and supply the pressurized medium to a sub-reservoir 1100b or receive the pressurized medium from the sub-reservoir 1100b. In addition, the second main reservoir chamber 1102a may be connected to the first main reservoir flow path 1110a and the third main reservoir chamber 1103a may be connected to the second main reservoir flow path 1120a so that the second main reservoir chamber 1102a and the third main reservoir chamber 1103a may supply or receive the pressurized medium to or from the integrated master cylinder 1200.

Thus, as the main reservoir 1100a is provided by being divided into the first to third main reservoir chambers 1101a, 1102a, and 1103a, stable operation of the electronic brake system 1 may be promoted. As an example, when the main reservoir 1100a is formed as a single chamber and the capacity of the pressurized medium is not sufficient, the pressurized medium may not be stably supplied not only to the sub-reservoir 1100b but also to the integrated master cylinder 1200. Accordingly, as the main reservoir 1100a is provided by being divided into the first main reservoir chamber 1101a connected to the sub-reservoir 1100b of the electronic unit and the second and third main reservoir chambers 1102a and 1103a connected to the integrated master cylinder 1200, even when the pressurized medium is not supplied to any one component, braking of the vehicle may be implemented by supplying the pressurized medium to another component.

A main reservoir flow path is provided to hydraulically connect the integrated master cylinder 1200 and the main reservoir 1100a.

A reservoir flow path may include the first main reservoir flow path 1110a connecting the first master chamber 1220a and the second reservoir chamber of the main reservoir 1100a and the second reservoir flow path 1120a connecting the second master chamber 1230a and the third reservoir chamber 1103a of the main reservoir 1100a. To this end, one end of the first main reservoir flow path 1110a may communicate with the first master chamber 1220a of the integrated master cylinder 1200 and the other end may communicate with the second main reservoir chamber 1102a of the main reservoir 1100a, and one end of the second main reservoir flow path 1120a may communicate with the second master chamber 1230a of the integrated master cylinder 1200 and the other end may communicate with the third reservoir chamber 1103a of the main reservoir 1100a.

The electronic unit may include components electronically operated and controlled by a control signal of an electronic control unit (ECU, not shown) and be disposed in the second block 200.

The electronic unit may include the electronic control unit, a sub-reservoir 1100b secondarily storing the pressurized medium therein, a hydraulic pressure supply device 1300 receiving a driver's intention to brake as an electrical signal from a pedal displacement sensor 11, which detects a displacement of the brake pedal 10, and generating hydraulic pressure of the pressurized medium through a mechanical operation, a hydraulic control unit 1400 controlling hydraulic pressure provided from the hydraulic pressure supply device 1300 and hydraulic pressure transmitted to first to fourth wheel cylinders 21, 22, 23 and 24, a dump flow path 1800 connecting the third and fourth wheel cylinders 23 and 24 and the sub-reservoir 1100b and a dump valve 1810 provided thereon to control a flow of the pressurized medium, a dump control unit 1900 hydraulically connecting the sub-reservoir 1100b and the hydraulic pressure supply device 1300 and controlling a flow of the pressurized medium therebetween, and a cut valve 411 provided in the first connection line 410 to control a flow of the pressurized medium.

The sub-reservoir 1100b may be disposed in the second block 200 and secondarily store the pressurized medium. As the pressurized medium is secondarily stored by the sub-reservoir 1100b in the electronic unit, the pressurized medium may also be smoothly supplied and transmitted within the electronic unit such as the hydraulic pressure supply device 1300, the dump control unit 1900, first and second hydraulic circuits 1510 and 1520, and the like.

The sub-reservoir 1100b may be connected to a hydraulic pressure auxiliary device 1600 of the emergency module 300 by a second connection line 420, which will be described below, and connected to the main reservoir 1100a of the electronic unit by the third connection line 430. Besides, the sub-reservoir 1100b may be connected to pressure chambers 1330 and 1340 of the hydraulic pressure supply device 1300 through the dump control unit 1900 by a sub-reservoir flow path 1110b and connected to the second hydraulic circuit 1520 by the dump flow path 1800 which will be described below.

The sub-reservoir 1100b may be provided by being divided into a plurality of chambers by partition walls 1105b. The sub-reservoir 1100b may include a plurality of sub-reservoir chambers 1101b, 1102b, and 1103b, and the plurality of sub-reservoir chambers 1101b, 1102b, and 1103b may be disposed side by side in a single row. Specifically, the sub-reservoir 1100b may be distinguished into a first sub-reservoir chamber 1101b disposed at the center, a second sub-reservoir chamber 1102b disposed at one side, and a third sub-reservoir chamber 1103b disposed at the other side.

Each of the partition walls 1105b may be provided between adjacent sub-reservoir chambers, and each of the partition walls 1105b may be provided with at least a part of an upper end open. Thus, the adjacent sub-reservoir chambers 1101b, 1102b, and 1103b may communicate with each other so that the pressurized medium may move. As an example, when a large amount of pressurized medium is introduced into the first sub-reservoir chamber 1101b, the pressurized medium may pass over the upper end of the partition walls 1105b and be transmitted to the second sub-reservoir chamber 1102b or the third sub-reservoir chamber 1103b.

The first sub-reservoir chamber 1101b and the second sub-reservoir chamber 1102b may be connected to the dump control unit 1900 by the sub-reservoir flow path 1110b communicating therewith, which will be described below, and the second sub-reservoir chamber may supply the pressurized medium to the main reservoir 1100a or receive the pressurized medium from the main reservoir 1100a by being connected to the third connection line 430, which will be described below. In addition, the third sub-reservoir chamber 1103*b* may be connected to the dump flow path 1800, which will be described below, and a downstream side of each of first and second outlet valves 1522*a* and 1522*b* of the second hydraulic circuit 1520, so that the pressurized medium may be transmitted thereto.

Thus, as the sub-reservoir 1100*b* is provided by being divided into the first to third sub-reservoir chambers 1101*b*, 1102*b*, and 1103*b*, the stable operation of the electronic brake system 1 may be promoted. As an example, when the sub-reservoir 1100*b* is formed as a single chamber and the capacity of the pressurized medium is not sufficient, the pressurized medium may not be stably supplied not only to the main reservoir 1100*a* but also to the dump control unit 1900 and the hydraulic pressure supply device 1300. Accordingly, as the sub-reservoir 1100*b* is provided by being divided into the first and second sub-reservoir chambers 1101*b* and 1102*b* connected to the dump control unit 1900 and the hydraulic pressure supply device 1300, the second sub-reservoir chamber 1102*b* connected to the main reservoir 1100*a* of the mechanical unit, and the third sub-reservoir chamber 1103*b* connected to the dump flow path 1800 and the outlet valves 1522*a* and 1522*b*, even when the pressurized medium is not supplied to any one component, braking of the vehicle may be implemented by supplying the pressurized medium to another component.

The hydraulic pressure supply device 1300 is provided to receive a driver's intention to brake as an electrical signal from the pedal displacement sensor 11, which detects a displacement of the brake pedal 10, implement reciprocating movement of a hydraulic piston 1320, and thus generate hydraulic pressure of the pressurized medium.

The hydraulic pressure supply device 1300 may include a hydraulic pressure supply unit supplying a pressure of the pressurized medium transmitted to a wheel cylinder and a power supply unit (not shown) generating power of the hydraulic piston 1320 based on the electrical signal of the pedal displacement sensor 11.

The hydraulic pressure supply unit includes a cylinder block 1310 provided to be capable of accommodating the pressurized medium, the hydraulic piston 1320 accommodated in the cylinder block 1310, and a sealing member provided between the hydraulic piston 1320 and the cylinder block 1310 to seal a pressure chamber.

The pressure chamber may include a first pressure chamber 1330 located in front side of the hydraulic piston 1320 (left side of the hydraulic piston 1320 in FIG. 1) and a second pressure chamber 1340 located in the rear side of the hydraulic piston 1320 (right side of the hydraulic piston 1320 in FIG. 1). That is, the first pressure chamber 1330 is provided to be partitioned by the cylinder block 1310 and a front surface of the hydraulic piston 1320 so that a volume thereof changes according to a movement of the hydraulic piston 1320, and the second pressure chamber 1340 is provided to be partitioned by the cylinder block 1310 and a rear surface of the hydraulic piston 1320 so that a volume thereof changes according to the movement of the hydraulic piston 1320.

The first pressure chamber 1330 may be hydraulically connected to the hydraulic control unit 1400, which will be described below, by a hydraulic flow path, and the second pressure chamber 1340 may also be hydraulically connected to the hydraulic control unit 1400 by a hydraulic flow path.

The sealing member includes a piston sealing member 1351 provided between the hydraulic piston 1320 and the cylinder block 1310 to seal between the first pressure chamber 1330 and the second pressure chamber 1340, and a drive shaft sealing member 1352 provided between the power supply unit and the cylinder block 1310 to seal between the second pressure chamber 1340 and an opening of the cylinder block 1310. Hydraulic pressure or negative pressure of the first pressure chamber 1330 and the second pressure chamber 1340 generated by the forward or backward movement of the hydraulic piston 1320 may not leak by being sealed by the piston sealing member 1351 and the drive shaft sealing member 1352 and may be transmitted to each of the hydraulic flow paths.

The power supply unit may generate and supply power of the hydraulic piston 1320 by an electrical signal. As an example, the power supply unit may include a motor (not shown) generating a rotational force and a power conversion unit (not shown) converting the rotational force of the motor into a translational movement of the hydraulic piston 1320, but is not limited the corresponding structure and device.

The dump control unit 1900 may be provided between the hydraulic pressure supply device 1300 and the sub-reservoir 1100*b* to control a flow of the pressurized medium, and to this end, include a plurality of flow paths and various types of solenoid valves. One end of the dump control unit 1900 may be connected to the first pressure chamber 1330 and the second pressure chamber 1340 of the hydraulic pressure supply device 1300, and the other end may be connected to the first sub-reservoir chamber 1101*b* of the sub-reservoir 1100*b* by the sub-reservoir flow path 1110*a*. The plurality of solenoid valves provided in the dump control unit 1900 are electrically operated and controlled by an electronic control unit.

The first pressure chamber 1330 and the second pressure chamber 1340 may be connected to the sub-reservoir 1100*b* via the dump control unit 1900. Through the dump control unit 1900, the first pressure chamber 1330 and the second pressure chamber 1340 may receive the pressurized medium from the sub-reservoir 1100*b*, and conversely, transmit the pressurized medium accommodated in the first pressure chamber 1330 and the second pressure chamber 1340 to the sub-reservoir 1100*b*.

The hydraulic control unit 1400 is provided between the hydraulic supply device 1300 and the wheel cylinder, and an operation thereof is controlled by the electronic control unit so that the hydraulic pressure transmitted to the wheel cylinders 21, 22, 23, and 24 may be adjusted.

The hydraulic control unit 1400 may have the first hydraulic circuit 1510 controlling a flow of the hydraulic pressure transmitted to the first and second wheel cylinders 21 and 22 among the four wheel cylinders 21, 22, 23, and 24 and the second hydraulic circuit 1520 controlling a flow of the hydraulic pressure transmitted to the third and fourth wheel cylinders 23 and 24, and includes a plurality of hydraulic flow paths and solenoid valves to control the hydraulic pressure transmitted from the integrated master cylinder 1200 and the hydraulic pressure supply device 1300 to the wheel cylinders.

The first and second hydraulic circuits 1510 and 1520 may include first to fourth inlet valves 1511*a*, 1511*b*, 1521*a*, and 1521*b* respectively controlling flows of the pressurized medium toward the first to fourth wheel cylinders 21, 22, 23, and 24. The first to fourth inlet valves 1511*a*, 1511*b*, 1521*a*, and 1521*b* may be disposed at upstream sides of the first to fourth wheel cylinders 21, 22, 23, and 24, respectively, and provided as normal open type solenoid valves that operate to be closed when receiving an electrical signal from the electronic control unit in a normally opened state.

The first and second hydraulic circuits 1510 and 1520 may include first to fourth check valves 1513*a*, 1513*b*, 1523*a*, and 1523*b* provided to be connected in parallel with respect to the first to fourth inlet valves 1511a, 1511b, 1521a, and 1521b. The first to fourth check valves 1513a, 1513b, 1523a, and 1523b may be provided on bypass flow paths that connect front sides and rear sides of the first to fourth inlet valves 1511a, 1511b, 1521a, and 1521b on the first and second hydraulic circuits 1510 and 1520, and may allow only the flow of the pressurized medium discharged from each of the wheel cylinders and block the flow of the pressurized medium from the hydraulic pressure supply device 1300 to the wheel cylinders. By the first to fourth check valves 1513a, 1513b, 1523a, and 1523b, the hydraulic pressure of the pressurized medium applied to each of the wheel cylinders may be quickly released, and even when the first to fourth inlet valves 1511a, 1511b, 1521a, and 1521b do not operate normally, the hydraulic pressure of the pressurized medium applied to the wheel cylinders may be smoothly discharged.

The second hydraulic circuit 1520 may include the first and second outlet valves 1522a and 1522b controlling discharge of the pressurized medium to improve performance when braking of the third and fourth wheel cylinders 23 and 24 is released. The first and second outlet valves 1522a and 1522b may detect braking pressure of each of the third and fourth wheel cylinders 23 and 24 and be selectively opened when decompression braking is required such as in an ABS dump mode or the like to discharge the pressurized medium applied to the third and fourth wheel cylinders 23 and 24 to the sub-reservoir 1100b. The first and second outlet valves 1522a and 1522b may be provided as normal closed type solenoid valves that operate to be opened when receiving an electrical signal from the electronic control unit in a normally closed state Meanwhile, the electronic brake system 1 according to the present embodiment includes a first fallback mode, in which the hydraulic pressure auxiliary device 1600 of the emergency module 300, which will be described below, intervenes when the electronic unit such as the hydraulic pressure supply device 1300 and the like is inoperative, and a second fallback mode in which the pressurized medium is directly transmitted from the integrated master cylinder 1200 to the first and second wheel cylinders 21 and 22 to perform braking when both the electronic unit and the hydraulic pressure auxiliary device 1600 are inoperative. Herein, in a state in which the hydraulic pressure of the pressurized medium is applied from the hydraulic pressure supply device 1300 to the third and fourth wheel cylinders 23 and 24, when switched to the first fallback mode or the second fallback mode, the hydraulic pressures applied to each wheel cylinder may be different so that behavior control of the vehicle may be difficult. Accordingly, in the first fallback mode or the second fallback mode, the hydraulic pressure applied to the third and fourth wheel cylinders 23 and 24 should be removed. To this end, the electronic unit includes the dump flow path 1800 connecting the second hydraulic circuit 1520, in which the hydraulic pressure auxiliary device 1600 is not installed, and the sub-reservoir 1100b.

Specifically, one end of the dump flow path 1800 may be connected to the third reservoir chamber 1103a of the sub-reservoir 1100b, and the other end may be connected to a front end or upstream side of each of the third and fourth inlet valves 1521a and 1521b in the second hydraulic circuit 1520, and in the dump flow path 1800, the dump valve 1810 controlling a flow of the pressurized medium may be provided. The dump valve 1810 may be provided as a normal open type solenoid valve that operates to be closed when receiving an electrical signal from the electronic control unit in a normally opened state As the dump valve 1810 is controlled to a closed state in a normal operation mode, the hydraulic pressure provided by the hydraulic pressure supply device 1300 may not leak into the sub-reservoir 1100b but be supplied to the third and fourth wheel cylinders 23 and 24 through the second hydraulic circuit 1520. However, when the electronic brake system 1 enters the first fallback mode or the second fallback mode, the dump valve 1810 may be switched to an opened state so that the pressurized medium applied to the third and fourth wheel cylinders 23 and 24 may be discharged to the sub-reservoir 1100b and thus the behavior of the vehicle may be stably controlled.

The electronic unit may include at least one cut value 411 provided in the first connection line 410, which will be described below, and controlling the flow of the pressurized medium. A detailed description thereabout will be presented below.

The electronic brake system 1 according to the present embodiment further include a plurality of pressure sensors P disposed in a variety of flow paths to detect the hydraulic pressure of the pressurized medium. In FIG. 1, the pressure sensors P are illustrated as being disposed on each of the second master chamber 1230a, the second hydraulic circuit 1520, and the hydraulic pressure auxiliary device 1600, but are not limited to the corresponding positions and may include a case of being provided in various positions to detect the hydraulic pressure of the pressurized medium.

Meanwhile, when, in the electronic unit, the hydraulic pressure supply device 1300 is inoperative such as a failure or the hydraulic control unit 1400 is uncontrollable, the hydraulic pressure is not transmitted to the wheel cylinders 21, 22, 23, and 24, and thus there is a problem that active braking of the vehicle becomes difficult. Accordingly, the electronic brake system 1 according to the present embodiment is provided with the emergency module 300 that operates and intervene to secondarily supply the hydraulic pressure of the pressurized medium when the electronic unit is inoperative due to the failure of the hydraulic pressure supply device 1300 or the like.

The emergency module 300 includes the hydraulic pressure auxiliary device 1600, which operates and intervenes when the electronic unit such as the hydraulic pressure supply device 1300 or the like is inoperative, and may be mounted and installed in the vehicle by being disposed together in the second block 200, in which the electronic unit is disposed, or spaced apart from the second block 200.

The hydraulic pressure auxiliary device 1600 may be provided at the first and second wheel cylinders 21 and 22 of the first hydraulic circuit 1510 and operate when the hydraulic pressure supply device 1300 is inoperative due to the failure or the like to generate and provide hydraulic pressure required for braking of the first and second wheel cylinders 21 and 22. A mode, in which the hydraulic pressure auxiliary device 1600 operates due to inoperativeness of the hydraulic pressure supply device 1300, is referred to as the first fallback mode.

The hydraulic pressure auxiliary device 1600 includes a first isolation valve 1651 controlling a flow of the pressurized medium transmitted from at least any one of the integrated master cylinder 1200 or the hydraulic pressure supply device 1300 to the first wheel cylinder 21, a second isolation valve 1652 controlling a flow of the pressurized medium transmitted from at least any one of the integrated master cylinder 1200 or the hydraulic pressure supply device 1300 to the second wheel cylinder 22, a pair of pumps 1620 pressurizing the pressurized medium, a motor 1610 driving the pair of pumps 1620, a first auxiliary hydraulic flow path 1631 transmitting the pressurized medium pressurized by the pumps 1620 to the first wheel cylinder 21, a second auxiliary hydraulic flow path 1632 transmitting the pressurized medium pressurized by the pumps 1620 to the second wheel cylinder 22, a first support valve 1631a provided in the first auxiliary hydraulic flow path 1631 to control the flow of the pressurized medium, a second support valve 1632a provided in the second auxiliary hydraulic flow path 1632 to control the flow of the pressurized medium, a first auxiliary dump flow path 1641 discharging the pressurized medium applied to the first wheel cylinder 21, a second auxiliary dump flow path 1642 discharging the pressurized medium applied to the second wheel cylinder 22, a first discharge valve 1641a provided in the first auxiliary dump flow path 1641 to control the flow of the pressurized medium, and a second discharge valve 1642a provided in the second auxiliary dump flow path 1642 to control the flow of the pressurized medium.

The first and second isolation valves 1651 and 1652 are provided to allow or block a hydraulic connection between any one of the integrated master cylinder 1200 and the hydraulic pressure supply device 1300 and the first and second wheel cylinders 21 and 22, respectively.

When the hydraulic pressure of the pressurized medium generated by the pumps 1620 leaks into the hydraulic pressure supply device 1300 when the hydraulic pressure auxiliary device 1600 operates, a level of braking required by the driver is different from a braking force actually generated in each of the first and second wheel cylinders 21 and 22 so that there is a risk of a safety accident. In addition, when the hydraulic pressure generated and provided by the hydraulic pressure auxiliary device 1600 is not wholly transmitted to the first and second wheel cylinders 21 and 22 but leaks into a component on the other side, there is a problem that quick braking of the wheel cylinders is not implemented.

Accordingly, the first and second isolation valves 1651 and 1652 may allow the hydraulic connection of the integrated master cylinder 1200 and the hydraulic pressure supply device 1300 to the first and second wheel cylinders 21 and 22 in the normal operation mode and the second fallback mode and block the hydraulic connection of the integrated master cylinder 1200 and the hydraulic pressure supply device 1300 to the first and second wheel cylinders 21 and 22 in the first fallback mode.

The first isolation valve 1651 may be provided between the first wheel cylinder 21 and the downstream side of the first inlet valve 1511a and provided to allow and block the flow of the pressurized medium. The first isolation valve 1651 may be provided as a normal open type solenoid valve that operates to be opened when receiving an electrical signal from the electronic control unit in a normally opened state.

The second isolation valve 1652 may be provided between the second wheel cylinder 22 and the downstream side of the second inlet valve 1512a and provided to allow and block the flow of the pressurized medium. The second isolation valve 1652 may be provided as a normal open type solenoid valve that operates to be opened when receiving an electrical signal from the electronic control unit in a normally opened state.

When it is determined that the hydraulic pressure supply device 1300 is inoperative due to a failure or the like, the electronic control unit may switch to the first fallback mode to close the first and second isolation valves 1651 and 1652 and operate the motor 1610. The motor 1610 may be operated by receiving a driver's intention to brake as an electrical signal from the pedal displacement sensor 11 that detects a displacement of the brake pedal 10. The motor 1610 may operate the pair of pumps 1620 by receiving power from a battery or the like.

The pair of pumps 1620 may pressurize the pressurized medium according to reciprocating movement of a piston (not shown) provided in the motor 1610. The pumps 1620 receive the pressurized medium from the second connection line 420 connected to the sub-reservoir 1100b and pressurize the pressurized medium by operation of the motor 1610 to a hydraulic pressure level required for braking.

The pressurized medium whose hydraulic pressure is generated by any one pump 1620 of the pair of pumps 1620 may be transmitted to the first wheel cylinder 21 by the first auxiliary hydraulic flow path 1631 provided as a discharge side flow path of the pump 1620. To this end, an inlet side end portion of the first auxiliary hydraulic flow path 1631 may be connected to the discharge side of the pump 1620, and an outlet side end portion may be connected to the first wheel cylinder 21, and the first support valve 1631a controlling the flow of the pressurized medium transmitted from the pump 1620 to the first wheel cylinder 21 is provided on the first auxiliary hydraulic flow path 1631. The first support valve 1631a may be provided as a normal closed type solenoid valve that operates to be opened when receiving an electrical signal from the electronic control unit in a normally closed state. When switched to the first fallback mode, the electronic control unit may open the first support valve 1631a so that the hydraulic pressure of the pressurized medium discharged from the pump 1620 may be provided to the first wheel cylinder 21.

The pressurized medium whose hydraulic pressure is generated by the other pump 1620 of the pair of pumps 1620 may be transmitted to the second wheel cylinder 22 by the second auxiliary hydraulic flow path 1632 provided as a discharge side flow path of the pump 1620. To this end, an inlet side end portion of the second auxiliary hydraulic flow path 1632 may be connected to the discharge side of the pump 1620, and an outlet side end portion may be connected to the second wheel cylinder 22, and the second support valve 1632a controlling the flow of the pressurized medium transmitted from the pump 1620 to the second wheel cylinder 22 is provided on the second auxiliary hydraulic flow path 1632. Like the first support valve 1631a, the second support valve 1632a may be provided as a normal closed type solenoid valve that operates to be opened when receiving an electrical signal from the electronic control unit in a normally closed state. When switched to the first fallback mode, the electronic control unit may open the second support valve 1632a so that the hydraulic pressure of the pressurized medium discharged from the pump 1620 may be provided to the second wheel cylinder 22.

The pressurized medium applied to the first wheel cylinder 21 may be discharged through the first auxiliary dump flow path 1641. To this end, one side end portion of the first auxiliary dump flow path 1641 may be connected to the first wheel cylinder 21 or a downstream side of the first support valve 1631a of the first auxiliary hydraulic flow path 1631, and the other side end portion may be connected to the sub-reservoir 1100b or connected to an inlet end side of the pump 1620 through the second connection line 420, which will be described below. The first discharge valve 1641a controlling the flow of the pressurized medium discharged from the first wheel cylinder 23 is provided on the first auxiliary dump flow path 1641. The first discharge valve 1641a may be provided as a normal closed type solenoid valve that operates to be opened when receiving an electrical signal from the electronic control unit in a normally closed state.

The pressurized medium applied to the second wheel cylinder 22 may be discharged through the second auxiliary dump flow path 1642. To this end, one side end portion of the second auxiliary dump flow path 1642 may be connected to the second wheel cylinder 21 or a downstream side of the second support valve 1632a of the second auxiliary hydraulic flow path 1632, and the other side end portion may be connected to the sub-reservoir 1100b or connected to the inlet end side of the pump 1620 through the second connection line 420, which will be described below. The second discharge valve 1642a controlling the flow of the pressurized medium discharged from the second wheel cylinder 22 is provided on the second auxiliary dump flow path 1642. Like the first discharge valve 1641a, the second discharge valve 1642a may be provided as a normal closed type solenoid valve that operates to be opened when receiving an electrical signal from the electronic control unit in a normally closed state.

The connection line 400 is provided to hydraulically connect the first block 100 of the mechanical unit, the second block 200 of the electronic unit, and the emergency module 300, which are disposed to be spaced apart from each other.

The connection line 400 may include the first connection line 410 connecting the integrated master cylinder 1200 of the mechanical unit and the first hydraulic circuit 1510 of the hydraulic control unit 1400, the second connection line 420 connecting the hydraulic pressure auxiliary device 1600 of the emergency module 300 and the sub-reservoir 1100b of the electronic unit, and the third connection line 430 connecting the main reservoir 1100a of the mechanical unit and the sub-reservoir 1100b of the electronic unit.

One end of the first connection line 410 may be connected to the second master chamber 1230a of the integrated master cylinder 1200, and the other end may be connected to the downstream or rear end sides of the first and second inlet valves 1511a and 1512a of the first hydraulic circuit 1510.

The cut valve 411 is provided in the first connection line 410 so that the pressurized medium flow between the second master chamber 1220a and 1230a of the integrated master cylinder 1200 and the first hydraulic circuit 1510 may be controlled. The other end of the first connection line 410 may be branched to be connected between the rear end or downstream side of the first inlet valve 1511a and the second inlet valve 1512a and a front end of the hydraulic pressure auxiliary device 1600, respectively.

The cut valve 411 may be provided as a normal open type solenoid valve that operates to be normally opened and to be closed when receiving a close signal from the electronic control unit.

As the cut valve 411 is controlled to a closed state in a normal operation mode that is a usual braking situation, the pressurized medium accommodated in the second master chamber 1230a is not transmitted to the first hydraulic circuit 1510 despite a pedal force of the brake pedal 10. In addition, as the cut valve 411 is controlled to the closed state in the normal operation mode, the hydraulic pressure of the pressurized medium provided from the hydraulic pressure supply device 1300 may not leak into the integrated master cylinder 1200 along the first connection line but be stably supplied toward the wheel cylinders 21, 22, 23, and 24.

However, as the cut valve 411 is put into an opened state in the second fallback mode that is switched on when the electronic unit and the emergency module are inoperative, the pressurized medium discharged from the first master chamber 1220a and the second master chamber 1230a of the integrated master cylinder 1200 may be supplied to the first and second wheel cylinders 21 and 22 through the first connection line 410 so that braking may be implemented.

The second connection line 420 is provided with one end connected to the sub-reservoir 1100b and the other end connected to the hydraulic pressure auxiliary device 1600 of the emergency module 300. Specifically, as the other end of the second connection line 420 is connected to the inlet end of the pumps 1620 and the first and second auxiliary dump flow paths 1641 and 1642, the pressurized medium may be supplied from the sub-reservoir 1100b to the inlet end side of the pumps 1620, or the pressurized medium may be discharged from the first and second auxiliary dump flow paths 1641 and 1642 to the sub-reservoir 1100b.

The third connection line 430 may be provided with one end communicating with the main reservoir 1100a and the other end communicating with the sub-reservoir 1100b. When there is too much or too little pressurized medium in a reservoir on one side, the third connection line 430 may allow transmission of the pressurized medium between reservoirs and thus promote smooth supply of the pressurized medium to each component.

The first connection line 410 may be provided as a pipe having a predetermined strength, and the second connection line 420 and the third connection line 430 may be provided as hoses having elasticity. As the pressurized medium whose hydraulic pressure is generated from the second master chamber 1230a is transmitted in the first connection line 410, the first connection line 410 may be provided as a pipe with a strength capable of enduring the hydraulic pressure to promote the durability and performance of the product. Meanwhile, as the second connection line 420 and the third connection line 430 are provided to be connected to the main reservoir 1100a or the sub-reservoir 1100b having an internal pressure at an atmospheric pressure level, the pressurized medium without hydraulic pressure formed is transmitted. Accordingly, the second connection line 420 and the third connection line 430 may be provided as hoses having elasticity so that ease of installation may be promoted according to disposing positions of the first block 100, the second block 200, and the emergency module 300. The first connection line 410 may be installed in a vehicle body by a fastening member (not shown) with a predetermined restoring force so that connectivity may be maintained despite an impact such as an accident of the vehicle or the like.

Hereinafter, an operation of the electronic brake system 1 according to the embodiment of the present invention will be described.

The operation of the electronic brake system 1 according to the embodiment of the present invention may be implemented in the normal operation mode in which the electronic brake system 1 normally operates without failure or abnormality of various devices and valves, in the first fallback mode in which the hydraulic pressure auxiliary device 1600 intervenes in an inoperative state of the hydraulic pressure supply device 1300, and in the second fallback mode in which both the hydraulic supply device 1300 and the hydraulic pressure auxiliary device 1600 are inoperative.

First, the normal operation mode of the electronic brake system 1 according to the embodiment of the present invention will be described.

Figure 2:
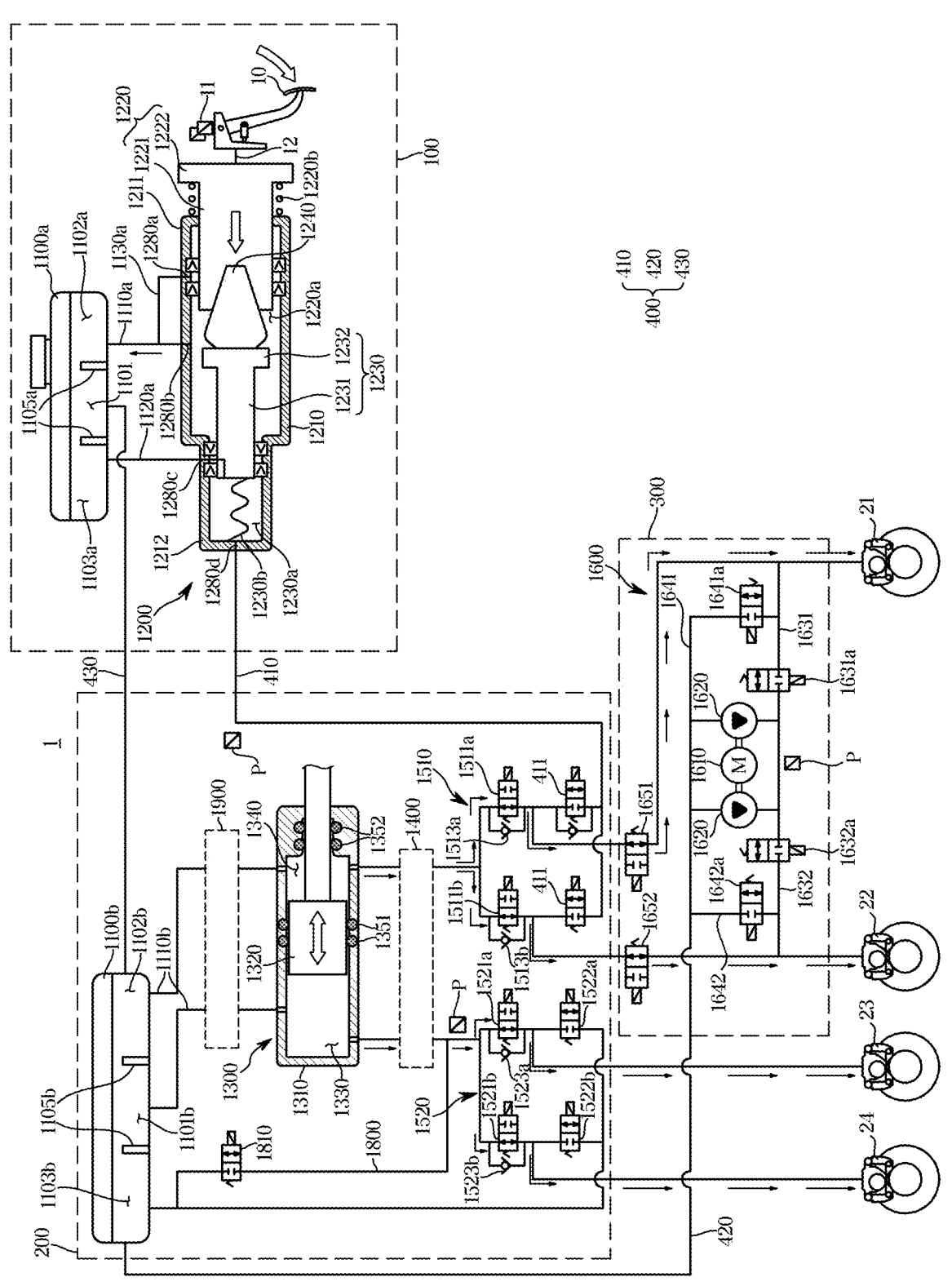
FIG. 2 is a hydraulic circuit diagram illustrating a state in which the electronic brake system according to the embodiment of the present invention performs a normal operation mode.

FIG. 2 is a hydraulic circuit diagram illustrating a state in which the normal operation mode of the electronic brake system 1 according to the embodiment of the present invention is performed. Referring to FIG. 2, when the driver applies a pedal force to the brake pedal 10 for braking of the vehicle, the electronic control unit operates the motor of the hydraulic pressure supply device 1300 in one direction based on displacement information of the brake pedal 10 detected by the pedal displacement sensor 11. A rotational force of the motor is transmitted to the hydraulic pressure supply unit by the power conversion unit, and the hydraulic piston 1320 of the hydraulic pressure supply unit operates to generate hydraulic pressure in the first pressure chamber 1330 or the second pressure chamber 1340. The hydraulic pressure generated in the first pressure chamber 1330 or the second pressure chamber 1340 is transmitted to each of the first to fourth wheel cylinders 21, 22, 23, and 24 through the hydraulic control unit 1400, the first hydraulic circuit 1510, and the second hydraulic circuit 1520 to generate a braking force.

In the normal operation mode, as the cut valve 411 provided in the first connection line 410 is switched to be closed, the pressurized medium of the integrated master cylinder 1200 is prevented from being transmitted to the wheel cylinders. In addition, the dump valve 1810 provided on the dump flow path 1800 is also switched to be closed. As the cut valve 411 and the dump valve 1810 are switched to be closed, the hydraulic pressure provided by the hydraulic pressure supply device 1300 is prevented from leaking into the integrated master cylinder 1200 and the sub-reservoir 1100b, so that quick braking may be implemented.

In the normal operation mode, as the first to fourth inlet valves 1511a, 1511b, 1521a, and 1521b maintain the opened state, the hydraulic pressure provided by the hydraulic pressure supply device 1300 may be smoothly transmitted to the first to fourth wheel cylinders 21, 22, 23, and 24, and as the first and second outlet valves 1522a and 1522b maintain the closed state, the pressurized medium may be prevented from leaking into the sub-reservoir 1100b.

Meanwhile, in the normal operation mode, when the driver applies a pedal force to the brake pedal 10, as the cut valve 411 is closed, the second master chamber 1230a is sealed. Accordingly, as the driver presses the brake pedal 10, the first master piston 1220 moves forward and thus a displacement is generated, while the second master piston 1230 does not generate a displacement and thus compress the pedal simulator 1240, so that an elastic restoring force by the compression of the pedal simulator 1240 may be provided to the driver as a pedal feeling. At this time, the pressurized medium accommodated in the first master chamber 1220a is discharged to the main reservoir 1100a through the first main reservoir flow path 1110a.

Since the normal operation mode is a state in which the hydraulic pressure supply device 1300 normally operates, the hydraulic pressure auxiliary device 1600 does not intervene, and the first and second isolation valves 1651 and 1652 maintain the opened state so that the hydraulic pressure of the pressurized medium supplied from the hydraulic pressure supply device 1300 may be smoothly provided to the first to fourth wheel cylinders 21, 22, 23, and 24.

Hereinafter, release of the normal operation mode of the electronic brake system 1 according to the embodiment of the present invention will be described.

Figure 3:
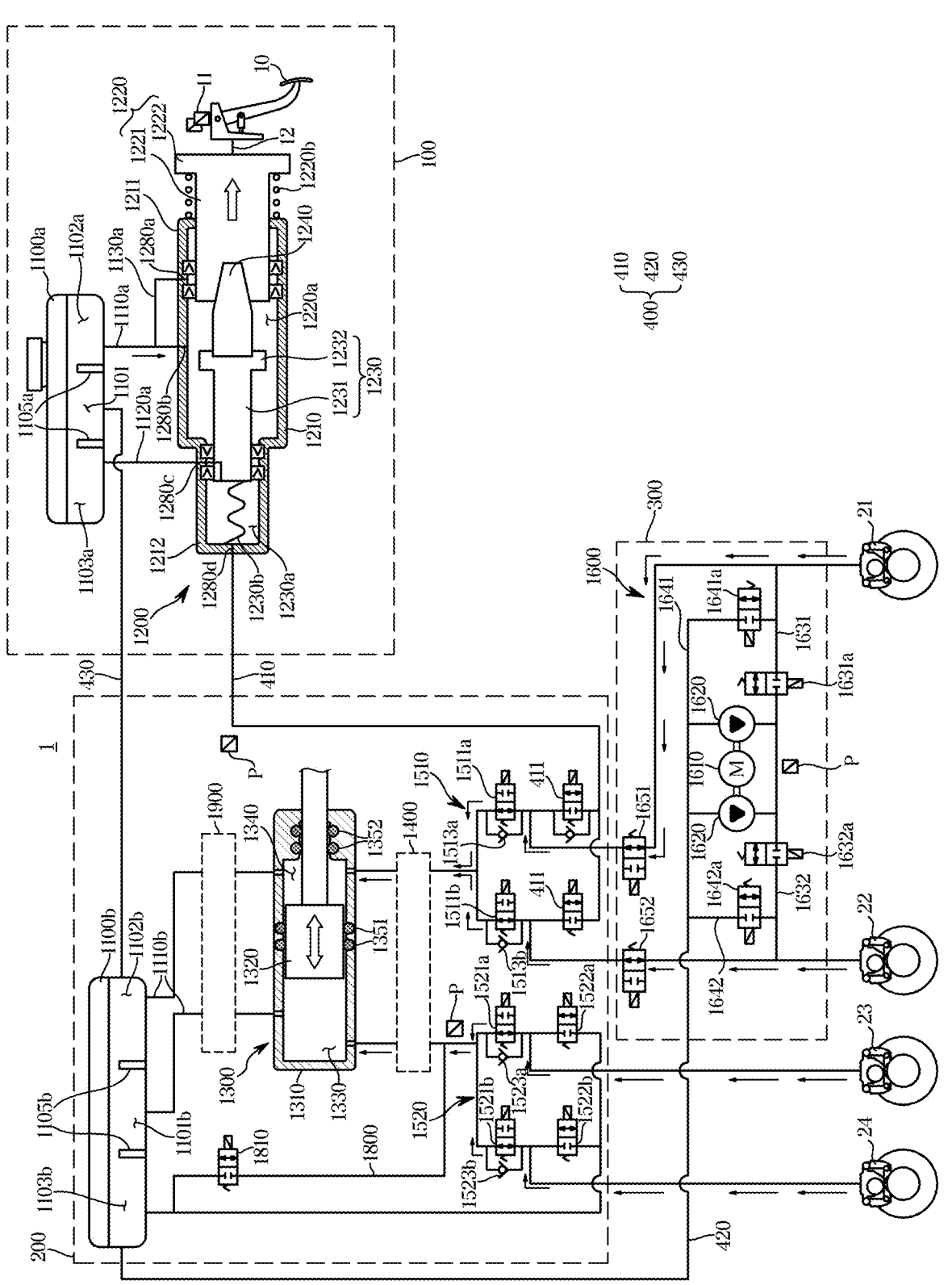
FIG. 3 is a hydraulic circuit diagram illustrating a state in which the electronic brake system according to the embodiment of the present invention releases the normal operation mode.

FIG. 3 is a hydraulic circuit diagram illustrating a state in which the electronic brake system 1 according to the embodiment of the present invention releases the normal operation mode, and referring to FIG. 3, when a pedal force applied to the brake pedal 10 is released, the electronic control unit operates the motor in the other direction based on displacement information of the brake pedal 10 detected by the pedal displacement sensor 11. A rotational force of the motor is transmitted to the hydraulic pressure supply unit by the power conversion unit, and the hydraulic piston 1320 of the hydraulic pressure supply unit is operated. Thus, negative pressure may be generated in the first pressure chamber 1330 or the second pressure chamber 1340, and the pressurized medium applied to the first to fourth wheel cylinders 201, 22, 23, and 24 may be returned to the first pressure chamber 1330 or the second pressure chamber 1340 so that braking may be released.

In the normal operation mode, as the first to fourth inlet valves 1511a, 1511b, 1521a, and 1521b maintain the opened state, the pressurized medium provided to the first to fourth wheel cylinders 21, 22, 23, and 24 may be smoothly recovered to the hydraulic pressure supply device 1300 through the hydraulic control unit 1400. In addition, in the normal operation mode, as the cut valve 411 and the dump valve 1810 are closed, the pressurized medium applied to the first to fourth wheel cylinders 21, 22, 23, and 24 does not leak into the integrated master cylinder 1200 or the sub-reservoir 1100b but may be wholly recovered to the first pressure chamber 1330 or the second pressure chamber 1340 of the hydraulic pressure supply device 1300. Meanwhile, the first and second outlet valves 1522a and 1522b maintain the closed state, and when quicker removal of the pressurized medium applied to the third and fourth wheel cylinders 23 and 24 is required, the first and second outlet valves 1522a and 1522b may be selectively opened.

Meanwhile, when the driver removes the pedal force on the brake pedal 10, the first master piston 1220 is returned to an original position by the first piston spring 1220b and an elastic restoring force of the pedal simulator 1240. As the volume of the first master chamber 1220a increases due to the return of the first master piston 1220 to the original position, the pressurized medium is supplied from the main reservoir 1100a to the first master chamber 1220a through the main reservoir flow path 1110a so that the inside of the first master chamber 1220a may be filled with the pressurized medium again.

Figure 4:
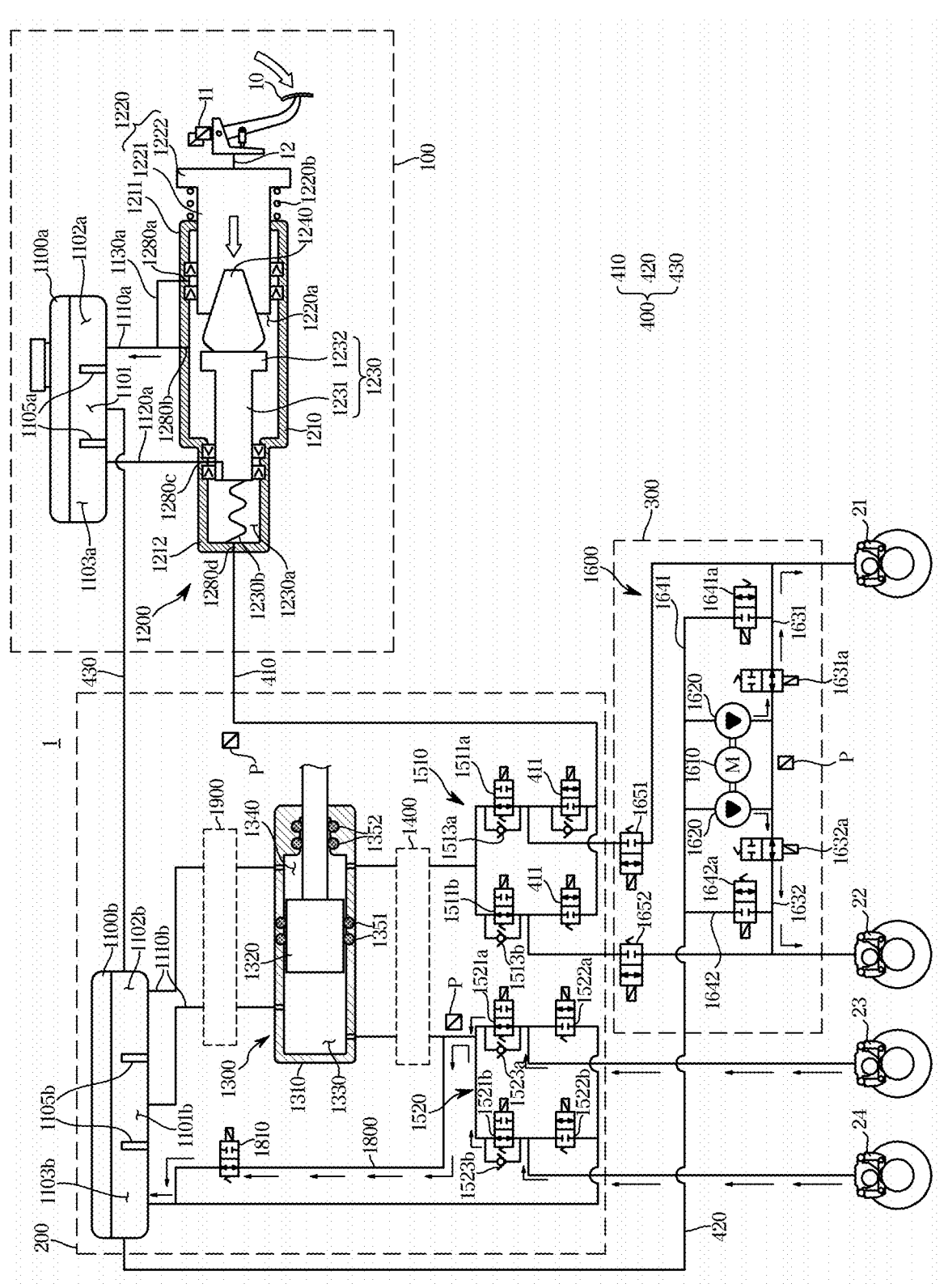
FIG. 4 is a hydraulic circuit diagram illustrating a state in which the electronic brake system according to the embodiment of the present invention performs a first fallback mode.
Figure 5:
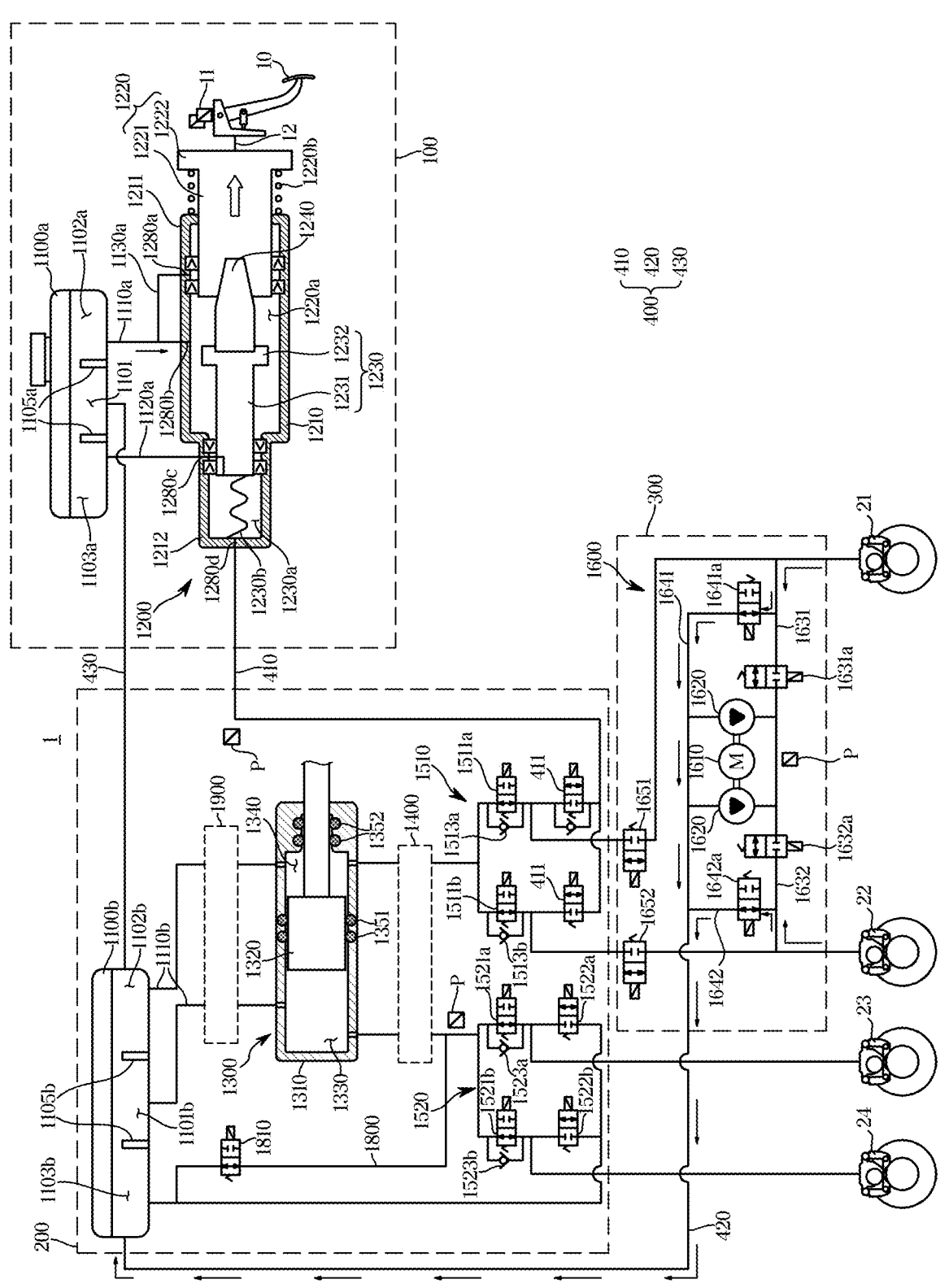
FIG. 5 is a hydraulic circuit diagram illustrating a state in which the electronic brake system according to the embodiment of the present invention releases the first fallback mode.

The electronic brake system 1 according to the embodiment of the present invention may be switched to the first fallback mode illustrated in FIGS. 4 and 5 when the hydraulic pressure supply device 1300 corresponds to an inoperative state such as a failure, a leakage of the pressurized medium, or the like.

FIG. 4 is a hydraulic circuit diagram illustrating a state in which the first fallback mode is performed when the hydraulic pressure supply device 1300 of the electronic brake system 1 according to the embodiment of the present invention is stopped. Referring to FIG. 4, the electronic control unit is switched to the first fallback mode when it is determined that the hydraulic pressure supply device 1300 is inoperative due to a failure or the like.

In the first fallback mode, when the driver applies a pedal force to the brake pedal 10, the electronic control unit operates the hydraulic pressure auxiliary device 1600 based on displacement information of the pedal brake pedal 10 detected by the pedal displacement sensor 11. When entering the first fallback mode, the electronic control unit hydraulically isolates the first and second wheel cylinders 21 and 22 from the hydraulic pressure supply device 1300 by operating the first isolation valve 1651 and the second isolation valve 1652 to be closed.

The electronic control unit may operate the motor 1610 of the hydraulic pressure auxiliary device 1600 based on the displacement information of the pedal, and the pair of pumps 1620 may generate hydraulic pressure of the pressurized medium by the operation of the motor 1610. The pressurized medium whose hydraulic pressure is generated by the pumps 1620 may be transmitted to the first and second wheel cylinders 21 and 22 through the first and second auxiliary hydraulic flow paths 1631 and 1632, respectively, and at this time, the first and second support valves 1631*a* and 1632*a* provided on the first and second auxiliary hydraulic flow paths 1631 and 1632, respectively, are operated in the opened state. In addition, as the first and second discharge valves 1641*a* and 1642*a* provided on the first and second auxiliary dump flow paths 1641 and 1642, respectively, are controlled to the closed state, the hydraulic pressure of the pressurized medium generated by the pumps 1620 may be prevented from leaking the sub-reservoir 1100*b* through the second connection line 420. Besides, the electronic control unit may open the dump valve 1810 to stably control the behavior of the vehicle in the first fallback mode and thus discharge the pressurized medium applied to the third and fourth wheel cylinders 23 and 24 to the sub-reservoir 1100*b* through the dump flow path 1800.

Meanwhile, since the integrated master cylinder 1200 and the pedal simulation operation in the first fallback mode are the same as the above-described operation of the normal operation mode, in order to prevent redundant description, a description thereof will be omitted.

Hereinafter, release of the first fallback mode of the electronic brake system 1 according to the embodiment of the present invention will be described.

FIG. 5 is a hydraulic circuit diagram illustrating a state in which the electronic brake system 1 according to the embodiment of the present invention releases the first fallback mode, and referring to FIG. 5, when the pedal displacement sensor 11 detects that the pedal force of the brake pedal 10 is released, the electronic control unit may switch the first and second support valves 1631*a* and 1632*a* provided on the first and second auxiliary hydraulic flow paths 1631 and 1632, respectively, to the closed state and thus prevent the pressurized medium from being transmitted from the motor 1610 and the pumps 1620 to the first and second wheel cylinders 21 and 22. At the same time, as the first and second discharge valves 1641*a* and 1642*a* provided on the first and second auxiliary dump flow paths 1641 and 1642, respectively, are switched to the opened state, the pressurized medium applied to the first and second wheel cylinders 21 and 22 may be transmitted to the second connection line 420 and discharged to the sub-reservoir 1100*b* or discharged to the inlet end side of the pumps 1620, so that braking of the first and second wheel cylinders 21 and 22 may be released.

Herein, as the first and second isolation valves 1651 and 1652 still maintain the closed state, the pressurized medium applied to the first and second wheel cylinders 21 and 22 may be prevented from being introduced to the hydraulic pressure supply device 1300.

Meanwhile, since the integrated master cylinder 1200 and the pedal simulation operation when the first fallback mode is released are the same as the above-described operation of the normal operation mode, in order to prevent redundant description, a description thereof will be omitted.

Figure 6:
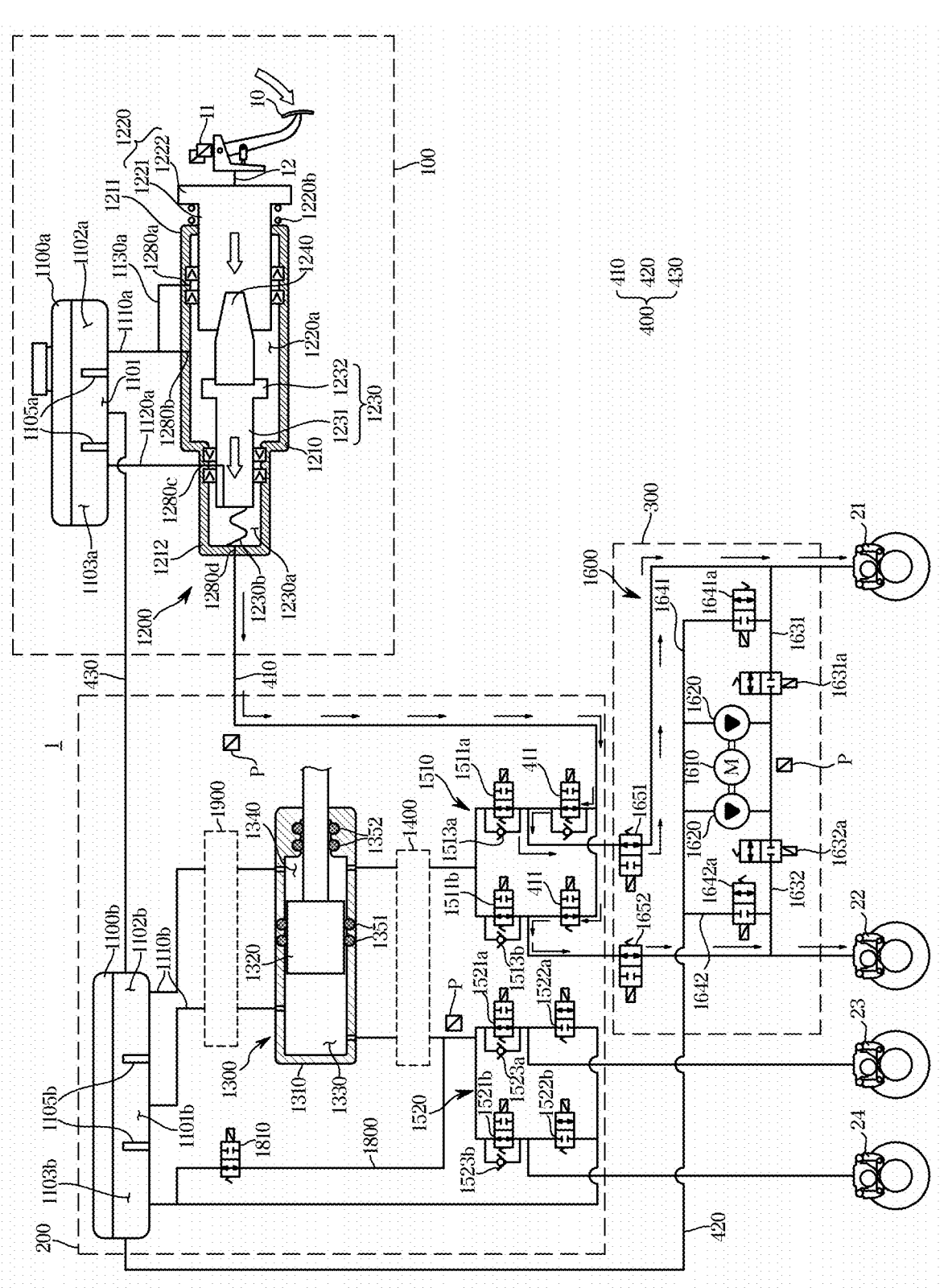
FIG. 6 is a hydraulic circuit diagram illustrating a state in which a second fallback mode is performed when a hydraulic pressure supply device and a hydraulic pressure auxiliary device of the electronic brake system according to the embodiment of the present invention are stopped.
Figure 7:
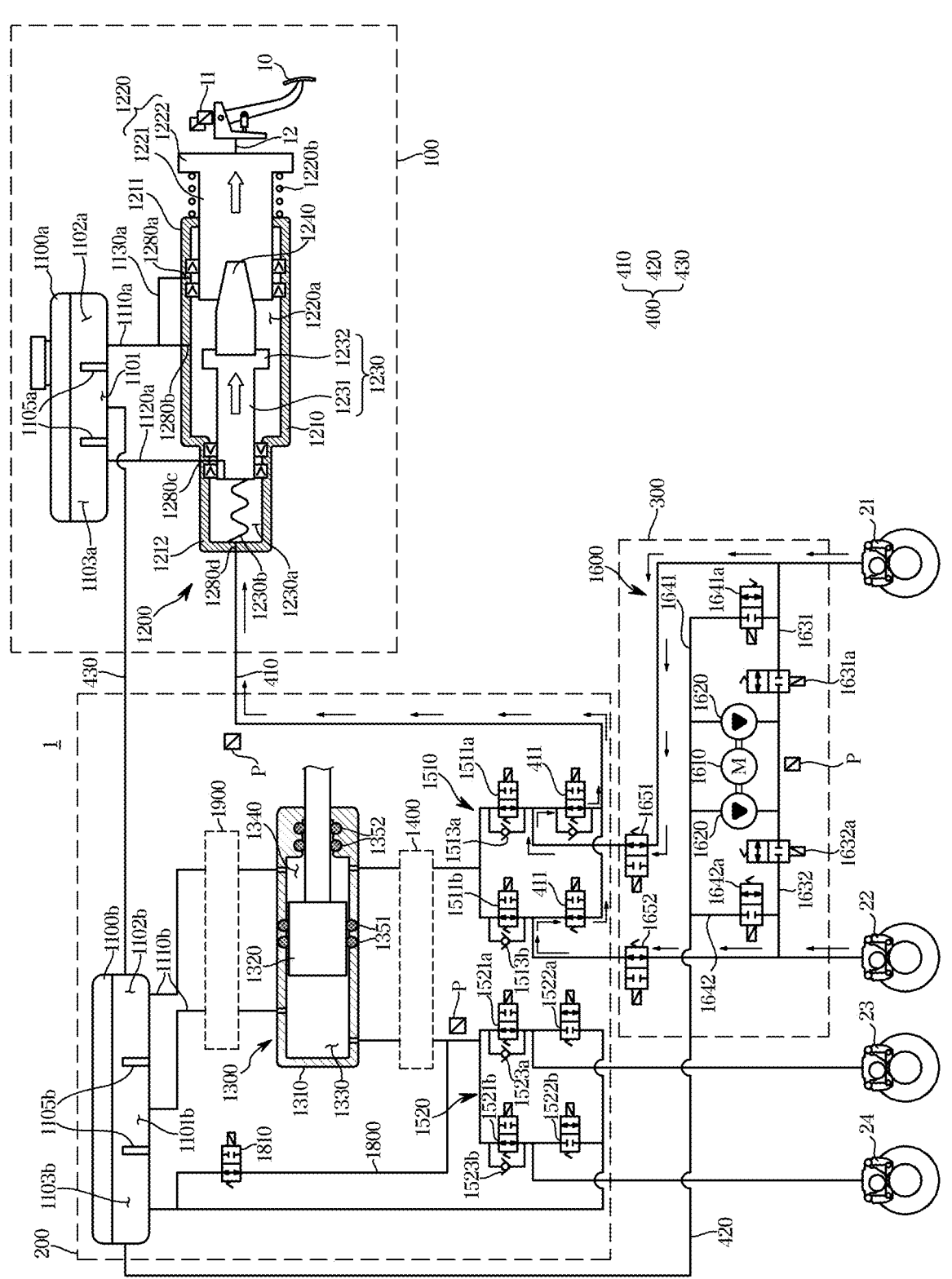
FIG. 7 is a hydraulic circuit diagram illustrating a state in which the electronic brake system according to the embodiment of the present invention releases the second fallback mode.

The electronic brake system 1 according to the embodiment of the present invention may be switched to the second fallback mode illustrated in FIGS. 6 and 7 when not only the hydraulic pressure supply device 1300 but also the hydraulic pressure auxiliary device 1600 corresponds to an inoperative state such as a failure, a leakage of the pressurized medium, or the like.

FIG. 6 is a hydraulic circuit diagram illustrating a state in which the second fallback mode is performed when the hydraulic pressure supply device 1300 and the hydraulic pressure auxiliary device 1600 of the electronic brake system 1 according to the embodiment of the present invention are stopped. Referring to FIG. 6, the electronic control unit is switched to the second fallback mode when it is determined that the hydraulic pressure supply device 1300 and the hydraulic pressure auxiliary device 1600 are inoperative due to a failure or the like.

In the second fallback mode, each valve is controlled to an inoperative state. Herein, when the driver applies a pedal force to the brake pedal 10, the first master piston 1220 connected to the brake pedal 10 moves forward so that a displacement is generated. In the inoperative state, as the cut valve 411 is provided in the opened state, the second master piston 1230 may also move forward due to the forward movement of the first master piston 1220, and thus the pressurized medium accommodated in the second master chamber 1230*a* may be transmitted to the first wheel cylinder 21 and the second wheel cylinder 22 of the first hydraulic circuit 1510 along the first connection line 410 to implement braking of the vehicle.

In the inoperative state, as the first and second isolation valves 1651 and 1652 of the hydraulic pressure auxiliary device 1600 maintain the opened state, the hydraulic pressure of the pressurized medium transmitted along the first connection line 410 in the second fallback mode may be stably transmitted toward the first and second wheel cylinders 21 and 22.

Hereinafter, an operation of releasing the second fallback mode by the electronic brake system 1 according to the embodiment of the present invention will be described.

FIG. 7 is a hydraulic circuit diagram illustrating a state in which the electronic brake system 1 according to the embodiment of the present invention releases the second fallback mode, and referring to FIG. 7, when the driver releases the pedal force applied to the brake pedal 10, the first and second master pistons 1220 and 1230, which have moved forward, are returned to the original positions by the first and second piston springs 1220*b* and 1230*b* and the elastic restoring force of the pedal simulator 120. As the first and second master pistons 1220 and 1230 are returned to the original positions, negative pressure may be generated in each of the first and second master chambers 1220*a* and 1230*a*, and the pressurized medium applied to the first and second wheel cylinders 21 and 22 may be recovered to the second master chamber 1230*a* along the first connection line 410, so that braking of the first and second wheel cylinders 21 and 22 may be released.

The invention claimed is:

1. An electronic brake system comprising:
   a first block in which a mechanical unit linked with a brake pedal to be mechanically operated is disposed;
   a second block in which an electronic unit electronically operated and controlled by an electronic control unit is disposed and which is disposed to be spaced apart from the first block;
   an emergency module operating when the electronic unit is inoperative and secondarily providing hydraulic pressure to a wheel cylinder; and
   a connection line hydraulically connecting the first block, the second block, and the emergency module,
   wherein the mechanical unit includes an integrated master cylinder having a first master piston connected to the brake pedal, a first master chamber whose volume is variable by a displacement of the first master piston, a second master piston provided to be displaceable by the displacement of the first master piston, a second master chamber whose volume is variable by a displacement of the second master piston, and a pedal simulator provided between the first master piston and the second mater piston, the electronic unit includes a hydraulic pressure supply device generating hydraulic pressure by operating a hydraulic piston by an electrical signal output in response to a displacement of the brake pedal or an electrical signal output from the electronic control unit and a hydraulic control unit having a plurality of flow paths and valves to control the hydraulic pressure transmitted from the hydraulic pressure supply device to the wheel cylinder, the emergency module includes a hydraulic pressure auxiliary device operating when the hydraulic pressure supply device is inoperative and providing hydraulic pressure to the wheel cylinder, and the connection line includes a first connection line having one end connected to the second master chamber and the other end connected to the hydraulic control unit, wherein the other end of the first connection line is connected between the first hydraulic circuit and the hydraulic pressure auxiliary device, wherein the first hydraulic circuit includes a first inlet valve and a second inlet valve respectively controlling flows of a pressurized medium supplied to the first wheel cylinder and the second wheel cylinder, and the other end of the first connection line is branched and connected to a downstream side of each of the first and second inlet valves.

2. The electronic brake system of claim 1, wherein the hydraulic control unit includes a first hydraulic circuit controlling hydraulic pressure transmitted to a first wheel cylinder and a second wheel cylinder and a second hydraulic circuit controlling hydraulic pressure transmitted to a third wheel cylinder and a fourth wheel cylinder, and the hydraulic pressure auxiliary device is provided between the first and second wheel cylinders and the first hydraulic circuit.

3. The electronic brake system of claim 2, wherein the electronic unit further includes at least one cut value provided in the first connection line and controlling a flow of a pressurized medium.

4. The electronic brake system of claim 2, wherein the electronic unit further includes:

a sub-reservoir in which a pressurized medium is stored;

a dump flow path connecting the second hydraulic circuit and the sub-reservoir; and a dump valve provided on the dump flow path and controlling a flow of the pressurized medium.

5. The electronic brake system of claim 4, wherein the second hydraulic circuit includes a third inlet valve and a fourth inlet valve respectively controlling flows of the pressurized medium supplied to the third wheel cylinder and the fourth wheel cylinder, and the dump flow path has one end connected to the sub-reservoir and the other end connected to an upstream side of each of the third and fourth inlet valves.

6. The electronic brake system of claim 5, wherein the second hydraulic circuit further includes a first outlet valve and a second outlet valve respectively controlling flows of the pressurized medium discharged from the third wheel cylinder and the fourth wheel cylinder to the sub-reservoir.

7. The electronic brake system of claim 4, wherein the electronic unit further includes a dump control unit provided between the sub-reservoir and the hydraulic pressure supply device to control the flow of the pressurized medium.

8. The electronic brake system of claim 1, wherein the hydraulic pressure auxiliary device includes a first isolation valve and a second isolation valve respectively allowing and blocking flows of a pressurized medium transmitted from the integrated master cylinder and the hydraulic pressure supply device to the first wheel cylinder and the second wheel cylinder, a pump pressurizing the pressurized medium, a motor driving the pump, a first auxiliary hydraulic flow path transmitting the pressurized medium pressurized by the pump to the first wheel cylinder, and a second auxiliary hydraulic flow path transmitting the pressurized medium pressurized by the pump to the second wheel cylinder.

9. The electronic brake system of claim 8, wherein the hydraulic pressure auxiliary device further includes a first auxiliary dump flow path discharging the pressurized medium applied to the first wheel cylinder and a second auxiliary dump flow path discharging the pressurized medium applied to the second wheel cylinder.

10. The electronic brake system of claim 9, wherein the hydraulic pressure auxiliary device further includes:

a first support valve provided on the first auxiliary hydraulic flow path to control the flow of the pressurized medium;

a second support valve provided on the second auxiliary hydraulic flow path to control the flow of the pressurized medium;

a first discharge valve provided on the first auxiliary dump flow path to control the flow of the pressurized medium; and a second discharge valve provided on the second auxiliary dump flow path to control the flow of the pressurized medium.

11. The electronic brake system of claim 9, wherein the connection line further includes a second connection line having one end connected to a sub-reservoir and the other end connected to the hydraulic pressure auxiliary device, and the other end of the second connection line is connected to an inlet end of the pump and the first and second auxiliary dump flow paths.

12. The electronic brake system of claim 11, wherein the mechanical unit further includes a main reservoir in which the pressurized medium is stored, and the connection line further includes a third connection line having one end connected to the main reservoir and the other end connected to the sub-reservoir.

13. The electronic brake system of claim 12, wherein the first connection line is provided as a rigid pipe, and the second connection line and the third connection line are provided as an elastic hoses.

* * * * *